United States Patent [19]
Masumura et al.

[11] Patent Number: 5,410,718
[45] Date of Patent: Apr. 25, 1995

[54] SINGLE-CHIP MICROCOMPUTER HAVING A MEMORY INCLUDING A ONE-BIT MEMORY ELEMENT WHICH HAS 3 INPUTS AND A SELECTOR FOR SELECTING ONE OF THE INPUTS

[75] Inventors: Shigeki Masumura, Kodaira; Tatsuya Aizawa, Ome; Kazuo Naito, Fuchu; Yoshiyuki Miwa, Kawasaki; Hideo Nakamura, Nishitama; Terumi Sawase, Hanno; Yasushi Akao, Kokubunji, all of Japan

[73] Assignees: Hitachi, Ltd.; Hitachi VLSI Engineering Corporation, both of Tokyo, Japan

[21] Appl. No.: 795,985

[22] Filed: Nov. 22, 1991

[30] Foreign Application Priority Data

Nov. 28, 1990 [JP] Japan .................................. 2-323170

[51] Int. Cl.6 .............................................. G06F 12/00
[52] U.S. Cl. ..................................... 395/800; 395/425; 365/189.01; 365/189.04; 364/925.5; 364/927.8; 364/925.6; 364/965.9; 364/DIG. 2; 364/232.8; 364/244.8
[58] Field of Search ............................. 395/800, 425; 365/189.01, 189.02, 189.04; 345/189

[56] References Cited

U.S. PATENT DOCUMENTS

| | | | |
|---|---|---|---|
| 5,093,909 | 3/1992 | Saito .................... | 395/400 |
| 5,097,445 | 3/1992 | Yamauchi ............... | 365/195 |
| 5,101,498 | 3/1992 | Ehlig et al. ............. | 395/800 |
| 5,175,840 | 12/1992 | Sawase et al. .......... | 395/425 |
| 5,179,689 | 1/1993 | Leach et al. ............ | 395/425 |
| 5,179,694 | 1/1993 | Keida et al. ............ | 395/550 |
| 5,206,945 | 4/1993 | Nishimukai et al. ..... | 395/425 |
| 5,321,845 | 6/1994 | Sawase et al. .......... | 395/800 |

Primary Examiner—Thomas G. Black
Assistant Examiner—Paul Harrity
Attorney, Agent, or Firm—Fay, Sharpe, Beall, Fagan, Minnich & McKee

[57] ABSTRACT

A single-chip microcomputer includes a microprocessor, a subprocessor for performing peripheral functions, an external port for controlling an input/output operation from/to an external device and a multi-functional logic-in-memory for inputting a plurality of data from at least one of the microprocessor, the subprocessor and the external port and selecting write data from among the plurality of data in accordance with predetermined priorities.

8 Claims, 8 Drawing Sheets

SINGLE-CHIP MICROCOMPUTER HAVING A MEMORY INCLUDING A ONE-BIT MEMORY ELEMENT WHICH HAS 3 INPUTS AND A SELECTOR FOR SELECTING ONE OF THE INPUTS

CROSS REFERENCE

This application is related to the U.S. patent application (Ser. No. 07/238,534) filed on Aug. 31, 1988 and the U.S. patent application (Ser. No. 07/410,109) filed on Sep. 20, 1988, now abandoned.

BACKGROUND OF THE INVENTION

The present invention relates to a single-chip microcomputer, and more particularly, to multi-functional logic in a buffer memory (a multi-functional logical buffer memory) accommodated therein suitable for input/output control buffer between a processor inside of the chip and a device outside thereof.

Dedicated hardwares such as various timers, a serial communication interface (SCI) for inputting/outputting serial data from/to a device outside of a chip, a direct memory access controller (DMAC) for accessing a memory not through a processor (CPU) but directly are conventionally mounted on the chip to achieve peripheral functions other than those performed by the CPU so that a single-chip microcomputer can attain high speed processing and high level functions. However, since such peripheral functions are performed by the dedicated hardwares, change in types or specifications of the peripheral functions is requested from a user in a case that necessary functions for a user are different from the peripheral functions achieved by the microcomputer, resulting in change in the hardware of the microcomputer.

From this reason, various proposals on architecture of the microcomputer are made. One of such proposals is disclosed in JP-A-01-162971 (corresponding to the U.S. patent application (Ser. No. 07/238,534) filed on Aug. 31, 1988) in which a hardware structure of the microcomputer is made flexible by providing a logic device for its peripheral functions and further the types and specifications of the peripheral functions can be changed relatively freely by providing a subprocessor in addition to the logic device and by changing the program for the subprocessor.

Further, there is already known a multi-functional logic-in-memory in JP-A-61-264453 as a buffer logic-in-memory for data input/output.

In the above conventional techniques, since the peripheral functions of the microcomputer is achieved based on a software, a time lag, i.e., a deviation of an execution time of the software due to emulation of the hardware functions by means of the software is caused during a data input/output operation. No technique for solving this problem is described in the above references.

An input/output interface function necessary for executing such peripheral functions in the single-chip microcomputer is mainly the following five processing functions:

1) a function for processing a plurality of data inputs in accordance with priorities and storing and holding the processing results,
2) a function for latching asynchronous input data not depending on a selecting signal,
3) a function for enabling the stored data to be always outputted regardless of read/write accesses,
4) a read and clear function for automatically resetting a register to a predetermined value, after data held in the register is read out, and
5) a function for making a free access possible in a bit, byte or word unit and making possible a multiple of accesses to a plurality of addresses, which include the same address, at the same time by an arbitrary combination of an accessing size of a bit/byte/word and an accessing mode of a read/write operation regardless of them.

Thus, in the conventional microcomputer the above input/output interface function cannot be performed effectively and a degree of freedom of the interface function is far restricted.

SUMMARY OF THE INVENTION

An object of the present invention is to provide a microcomputer in which the above five processing functions can be performed and there is provided a multi-functional logic-in-memory (multi-functional logical buffer memory) for realizing an input/output interface in which some of the above processing functions can be set freely.

In order to attain the above object, the microcomputer according to the first aspect of the present invention includes the logic-in-memory circuit in which a control circuit for performing necessary functions is provided for each storage element and can select a plurality of data from a microprocessor, a subprocessor, an externally connecting port and the like in accordance with predetermined priorities.

In the microcomputer according to the second aspect of the present invention, the storage elements are grouped in accordance with necessary functions so as to properly and distributedly assign respective functions to addresses.

In the microcomputer according to the third aspect of the present invention, the storage elements are integratedly arranged in a matrix manner so that each storage element is selected and controlled in accordance with a combination of a column selecting signal and a row selecting signal.

Furthermore, the multi-functional logic-in-memory is provided to include a control circuit for selecting a plurality of data in accordance with predetermined priorities and its application is not limited to a microcomputer.

According to the present invention, by providing a control circuit as mentioned above, data indicating necessary functions can be set in each storage element independently and thereby the multiple access processing function described in the above (5) can be realized in principle.

In a case that each control circuit is provided for a storage element so that an area for a layout of the control circuits and the storage elements increases, that is, in a case that an area efficiency of a chip is lowered for integration of many storage elements, the structure of the second or third aspect is effective. In the structure of the multi-functional logic-in-memory according to the second aspect, the storage elements are respectively provided for different functions to be realized, if necessary, to omit any useless function, resulting in increasing the area efficiency. In the structure of the circuit according to the third aspect, the number of selecting signals for selecting the storage elements can be decreased. That is, when the storage elements are constituted in a matrix manner of m columns and n rows the number of selecting signals can be decreased to (m+n)/mn. Therefore, the structure of the third aspect has larger advantage in a case that the numbers of selecting signals and control signals necessary for each storage element are increased.

DESCRIPTION OF THE PREFERRED EMBODIMENTS

The present invention will be described below in detail with reference to the accompanying drawings.

Figure 1:
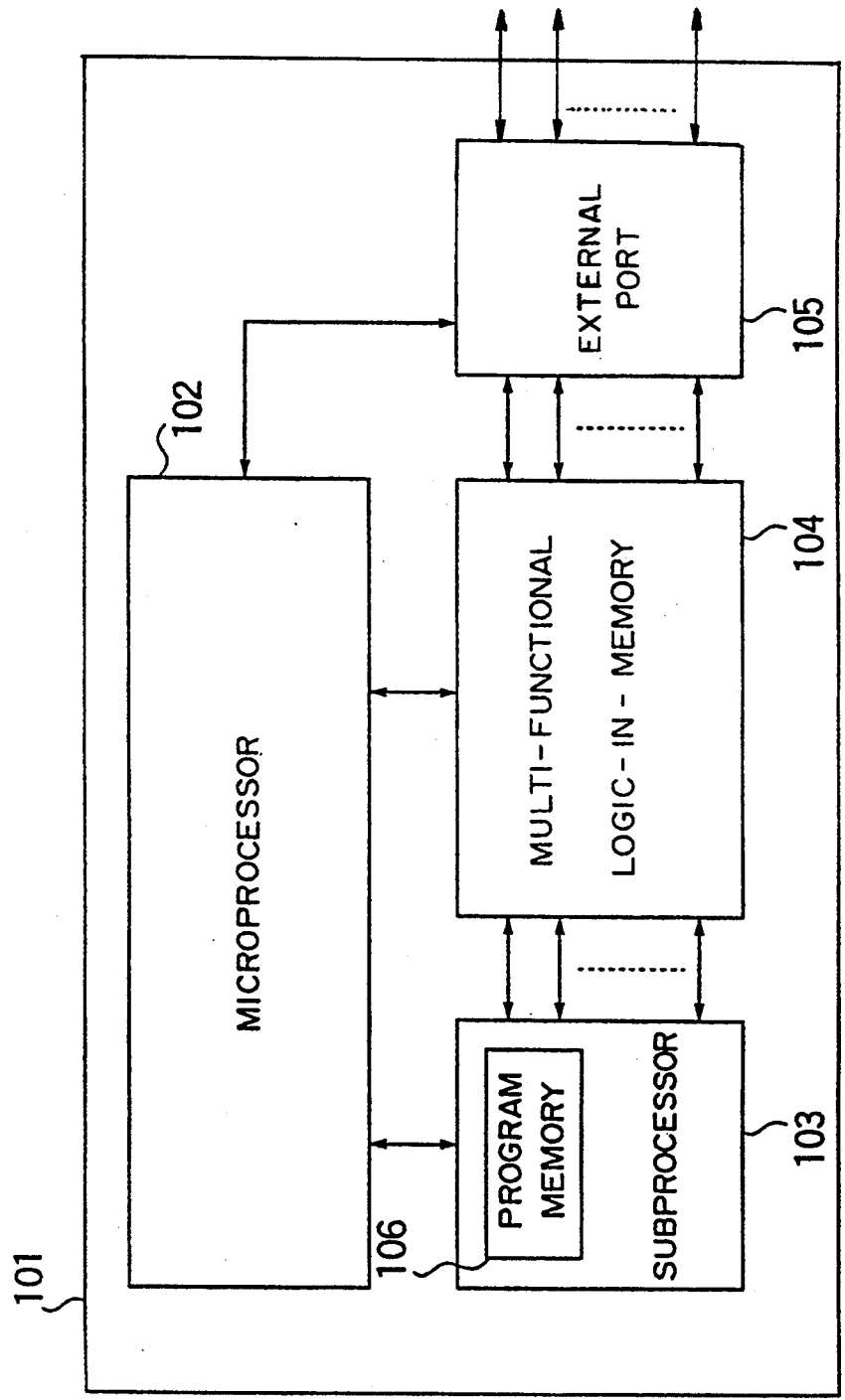
FIG. 1 is a block diagram for showing an arrangement of a single-chip microcomputer according to an embodiment of the present invention, the microcomputer accommodating a multi-functional logic-in-memory (multi-functional logical buffer memory) for input-/output control.

First, the background and basic concept of the present invention will be described. FIG. 1 shows an example of a single-chip microcomputer according to an embodiment of the present invention. In FIG. 1, a microcomputer includes a microprocessor 102 having a RAM and a ROM which is constituted of an EPROM. The microcomputer also includes a subprocessor 103 having a program memory 106, a multi-functional logic-in-buffer memory (a multi-functional logical memory) 104 for input/output control and an external port 105, other than the microprocessor 102. The subprocessor 103 executes a software stored in the program memory 106 to collectively realize a plurality of peripheral functions for the microcomputer such as a timer function. As such peripheral functions, there are various timer functions, application functions using respective timers, a function for achieving a serial communication interface (SCI) for inputting and outputting serial data from and to a device outside of the chip, a function for achieving a direct memory access controller (DMAC) by which a data transfer is performed not through a CPU, and the like. Such functions have conventionally been realized by exclusive hardwares provided on the chip 101 of the microcomputer.

The subprocessor 103 shown in FIG. 1 can realize these peripheral functions in parallel in a time-divisional manner by executing a software. Therefore, by changing the software to be executed, the peripheral functions can be changed easily without changing the hardware of the subprocessor 103. The change of the software can be attained by storing the software in the program memory 106, which is accommodated in the chip 101, such as an electrically programmable read-only nonvolatile memory (EPROM).

When the subprocessor 103 exchanges data with a device outside of the chip, time lags are caused for input/output timing of data, depending on an execution speed of the software and a frequency for each task to be executed time-divisionally, since the peripheral functions which are to be generally realized by hardwares are emulated by means of a software. For this reason there is provided in the present invention a multi-functional logic-in-memory 104 which functions as a input-/output buffer, to realize the peripheral functions without this time lag and thereby it is made possible to modify specification for input/output control in a bit unit or to perform priority control processing among the microprocessor 102, the subprocessor 103 and the external port 105. More particularly, the circuit 104 is provided between the subprocessor 103 and the port 105 and can manage and control centralizedly various specifications for the input/output control such as synchronization of an asynchronous signal, a setting operation of an input-/output control attribute of a terminal thereof, a switching operation of an input/output source, and the like. In addition, the microprocessor 102 can manage and control each of constituent elements in the circuit 104 from a higher standing point than the subprocessor 103.

Next, a functional structure of the buffer memory 104 and a relation between each constituent element of the logic-in-memory 104 and a function will be described below.

Figure 2:
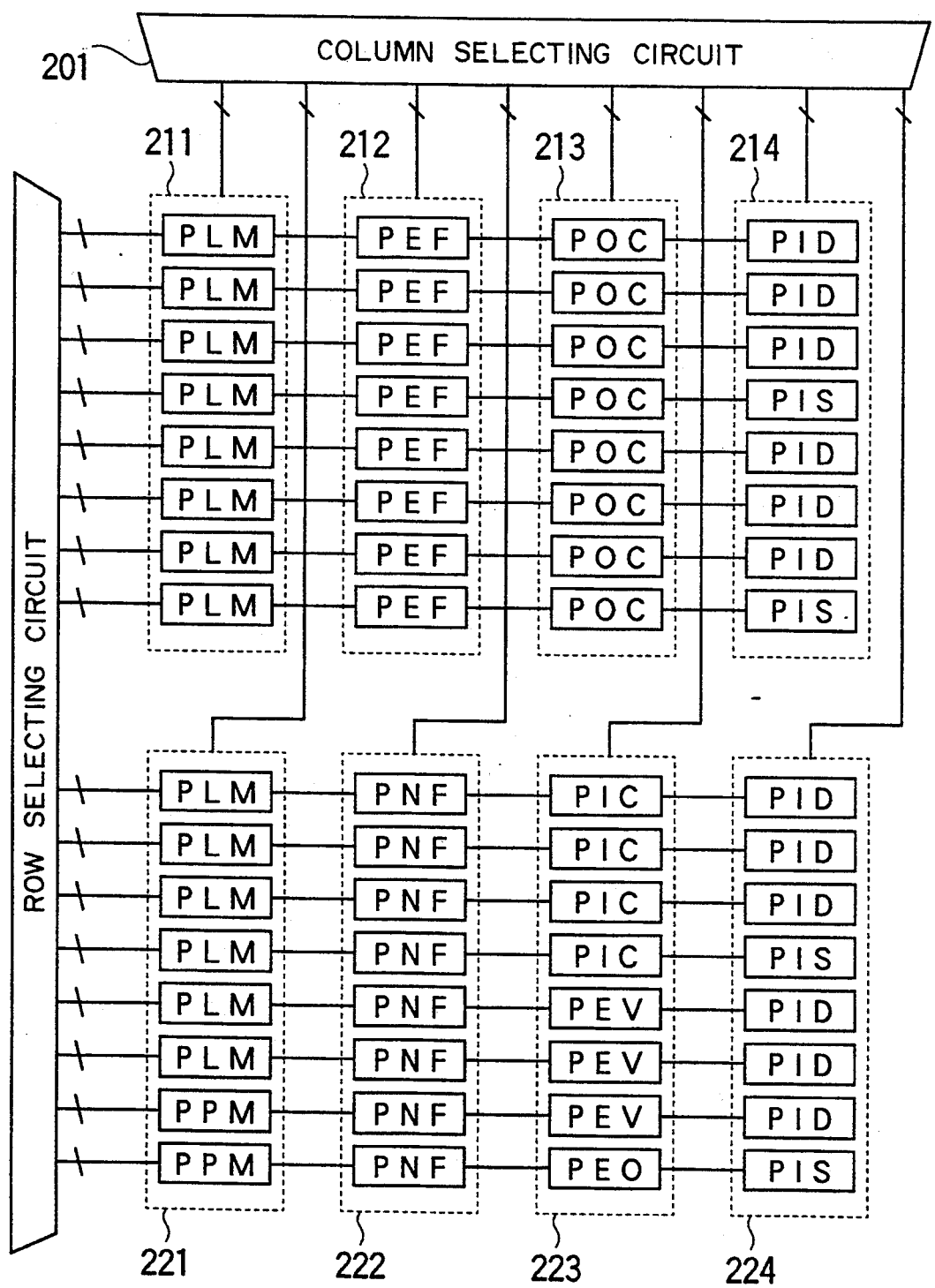
FIG. 2 is a block diagram showing a bit structure of the multi-functional logic-in-memory.

FIG. 2 is a diagram showing a bit structure of circuit 104 which can be accessed directly from the external circuit 104. It should be noted that a part of memory bits for controlling functions is omitted. The logic-in-memory 104 has ten types of fields of memory bits for different functions arranged in a matrix manner and can be accessed to in unit of bit, byte or word in accordance with a combination of a column selecting signal outputted from a column selecting circuit 201 and a row selecting signal outputted from a row selecting circuit 202. Note that there are plural signals for each of the column and row selecting signals and hence plural accessing operations can be made at the same time.

At first, an input/output function with respect to the subprocessor 103 will be described. The subprocessor 103 in the present invention operates in accordance with microinstructions and can perform an access for 2-bit data input and 1-bit data output at the same time to the logic-in-memory 104 in accordance with designations of three fields of a microinstruction, i.e., a P0 input designating field, a P1 output designating field and a Pck input designating field. In addition, access to the circuit 104 can be made in units of eight or sixteen bits in response to another microinstruction. Note that the input means that the subprocessor 103 reads out data from a memory bit field of the circuit 104 to use the read out data for operations or the like and on the other hand note that the output means that the subprocessor 103 writes data bits in a memory bit field of the logic-inmemory 104 in accordance with an operation result or the like.

In addition, by using another field of the microinstruction as a field for input capture control the subprocessor 103 reads out data of up to four bits from the logic-in-memory 104 and may perform the input capture control in accordance with the content of the read out data. Here, the input capture control means control concerning operation of write the operating result of a microinstruction into a specific register of the subprocessor 103.

Further, by operating control memory bits which are accommodated in the logic-in-memory 104, data up to three bits is read out from a specific field of memory bits of the logic-in-memory for every cycle and used for scheduling control of a plurality of tasks executed in the subprocessor 103. Here, a cycle is for executing a microinstruction by the subprocessor 103 and both the subprocessor 103 and the logic-in-memory 104 operate in synchronism with each executing cycle.

On an addressing scheme when the subprocessor 103 accesses to the logic-in-memory 104, a segment is specified for a word of each microinstruction and the P0, P1 and Pck fields can specify independently addresses in only the segment. Each segment is constituted of sixteen bits (4×4 bits) and four segments are obtained from four words. More specifically, a word is divided in a byte unit and further in a unit of four bits. One segment is constituted of the corresponding 4-bit portions of four words. That is, after the subprocessor 103 specifies an address of a segment based on a microinstruction, it specifies a column address and a row address in the specified segment for each of operations of the P0 input, P1 output and Pck input.

As to other constituent components, a field of sixteen bits of sixty four memory bits of the logic-in-memory 104 may be used as flags for an exception processing request to the microprocessor 102 and a field of another twenty four bits thereof which are connected to the port 105, may be used for data transfer between the port 105 and logic-in-memory 104. A field of two bit as call receiving bits is provided for directly interfacing with another module in the chip so that the logic-in-memory 104 can latch therein data from the module connected thereto for each cycle.

As shown in FIG. 2, a field of 64 memory bits of the multi-functional logic-in-memory 104 are divided into eight byte fields 211, 212, 213, 214, 221, 222, 223 and 224 and the microprocessor 102 can perform an read/write access to the logic-in-memory 104 in units of bytes. Each of four sets of byte fields 211 and 221, 212 and 222, 213 and 223 and 214 and 224 can be accessed in unit of word. When the write access by the microprocessor 102 conflicts with that from the subprocessor 103, the write access by the microprocessor 102 is performed with the highest priority and the write access from the subprocessor 104 is invalidated.

Next, 10 types of functions of the memory bit fields shown in FIG. 2 will be described below.

The fields 211 and 221 includes a field for a link flag PLN between tasks executed by the subprocessor 103 which may be used as if it is a mail box, in addition to a field for a link flag between it and the microprocessor 102. In addition, a bit field for the uppermost two bits PPM of the field 221 may be used to receive a call signal from the external as well as for the PLM function. When the call signal is asserted to a state, only the call signal of "1" is latched as the bits PPM, that is, the bits PPM operate similar to the bits PLM when the call signal is of "0".

By setting a control flag 311 or 321 to "1", when data for the P0 input or Pck input operation are read out from a memory bit field by the subprocessor 103, even if each value of the read out data is either "0" or "1" the values "0" are written in the memory bit field to clear it after the read operation is performed. This function is referred to as a read and clear operation hereinafter. When write operations in this memory bit field are conflicted with each other, the write operation with the highest priority is performed and the higher priorities are assigned to the P1 output operation by the subprocessor 103, the call receiving operation and the read and clear operation in order.

The field 222 shown in FIG. 2 is for memory bits PNF connected to the port 105 and are used mainly for input/output operation to/from the external. There are two types of connection attributes, i.e., an output to the port 105 and a through-input from the port 105. Whether or not the connection is made and which of two types of connection attributes is to be selected when the connection is made can be set in a control register in the port 105 in a unit of bit. Here, the through-input means that even if a value of the control register in the port 105 is any of "1" and "0" the value is written into a corresponding memory bit field without change for every state. The microprocessor 102 can perform a read access to this field and therefore does not conflict with the subprocessor 103. However, if the subprocessor 103 performs the P1 output operation to the memory bit field when the connection attribute to the port 105 is the through-input, the P1 output operation has a higher priority set temporarily for one state. If the connection attribute of the control register is not changed, the value of the port 105 is reflected again from a next state.

The field 213 shown in FIG. 2 is for memory bits POC which can be connected to the port 105, similar to the above field 222. Data in this field can be reflected to data of the field 214 which can be used as an interrupt flag to the microprocessor 102, in addition to the function of the field 222. Whether or not data of this field is reflected to the field 214 is controlled in accordance with a control flag 313 shown in FIG. 3. The setting condition of the data in the field 214 is whether or not this field is connected to the port 105 and whether or not "1" is written in the field 213 upon the P1 output operation by the subprocessor 103 regardless of any connection attribute when the field 213 is connected to the port 105. The field 214 cannot be set under a condition other than the P1 output operation of "1" by the subprocessor 103. The field is mainly for outputting data to a device outside of the chip 101 and at the same time can set corresponding bits in the field 214 which can be used as the interrupt flag to the microprocessor 102. It should be noted that only the read access can be performed from the microprocessor 102 and the priority control upon confliction of the write operations is similar to the field 222.

The field 223 shown in FIG. 2 can be connected to the port 105 similar to the field 213 and an edge detecting input mode can be set as the input or connection attribute of the port 105 in addition to the function of the field 213. In the edge detecting input mode, data is set in the field 223 when a rising or falling edge or both edges of an input signal from a device outside of the chip 101 are detected in the port 105. When the edge of the input signal is detected, the port 105 outputs an asserted signal for one cycle to the field 223. "1" is set in the field 223 in accordance with determination of the asserted signal. The read and clear mode is automatically set in the edge detecting input mode and the field 223 is cleared to "0" after data held in the field 223 is read out by executing the P0 input or Pck input operation by the subprocessor 103. The field 223 includes a field for four memory bits PIC which can be used as condition bits for the input capture control mentioned above. Even when the input capture control is performed the read and clear operation is automatically performed if the connection attribute to the port 105 is in the edge detecting input mode. The field 223 also includes a field for three memory bits PEV which can always be read out by setting of a control flag 315 shown in FIG. 3 and can be used, therefore, as data for a sequence control. Note that the read and clear operation is not performed at this time. The setting operation of data in the field 224 which can also be used as an interrupt flag to the microprocessor 102 can be controlled in accordance with a control flag 323 shown in FIG. 3, similar to the above field 213 but the setting condition is different from that in the field 213. That is, when the connection attribute to the port 105 is in the edge detecting input mode and when the P0 input and Pck input operations are performed or "1" is read out as a condition of the input capture control, data is automatically set in the field 224, i.e., when "1" is read and when the field for the memory bits are cleared to "0" by the read and clear operation. This condition is effective for a field of memory bit PEO in the field 223. This field 223 is used for mainly inputting data from the external device. In a case that the edge detection is established, the data is read in the subprocessor 103. At the same time, the data can set a corresponding memory bit of the field 224 which can be used as the interrupt flag to the microprocessor 102. It should be noted that only the read access from the microprocessor 102 is allowed. When write operations conflict with each other, the P1 output operation has the highest priority and the input operation from the port 105 and the read and clear operation follows the P1 output operation, and the priority control processing is performed in order of the higher priorities. However, treatment of the P1 output operation in the input or connection attribute from the port 105 is the same as in the field 213.

When the above field 223 is connected to the port 105 in the edge detecting input mode, the edge detecting data read in the field 212 shown in FIG. 2 is reflected to a field for the memory bits PEF at the same timing. When the edge detecting input mode is not set, the field 212 functions in the same manner as the field for the memory bits PLM. However, the read and clear operation is always performed upon the P0 input and Pck input operation. The field 212 may be used mainly in a case that data, the edge of which is detected, is to be utilized by two tasks executed on the subprocessor 103. However, the field 212 cannot be set in the field 214 which can be used as the interrupt flag, and cannot also be directly connected to the port 105 when the edge detecting input mode is not set. It should be noted that only the read access from the microporcessor 102 is allowed and the priority control processing upon confliction of write operations is the same as in the field 223.

At last, each of the byte fields 214 and 224 shown in FIG. 2 can be used as an interrupt status flag to the microprocessor 102. Fields for the two sets of two memory bits PIS in the fields 214 and 224 are used for interrupt flags without a DTC clear function and fields for the remaining memory bits therein are interrupt flags with the DTC clear function. Here, DTC is a unit having a hardware specified for data transfer, for supporting interrupt processing in the microprocessor 102, or a functional operation of the unit. If the DTC is used, data transfer between an accommodated module, a memory and the port can be performed independent of the program executed on the microprocessor 102 and can clear an interrupt flag of an interrupt requesting source in a bit unit. An automatic clear operation of the interrupt flag performed by initiation of the DTC is called the DTC clear. This fields can be used to request the interrupt processing to the microprocessor 102 under conditions generated in the field 213 or 223 by indirectly setting the fields 214 and 224, as described in the fields 213 and 223. The P0 input operation, the P1 output operation, the Pck input operation, or the like by the subprocessor 103 for this field 214 or 224 are allowed as in other fields. However, there is not performed the read and clear operation.

Figure 3:
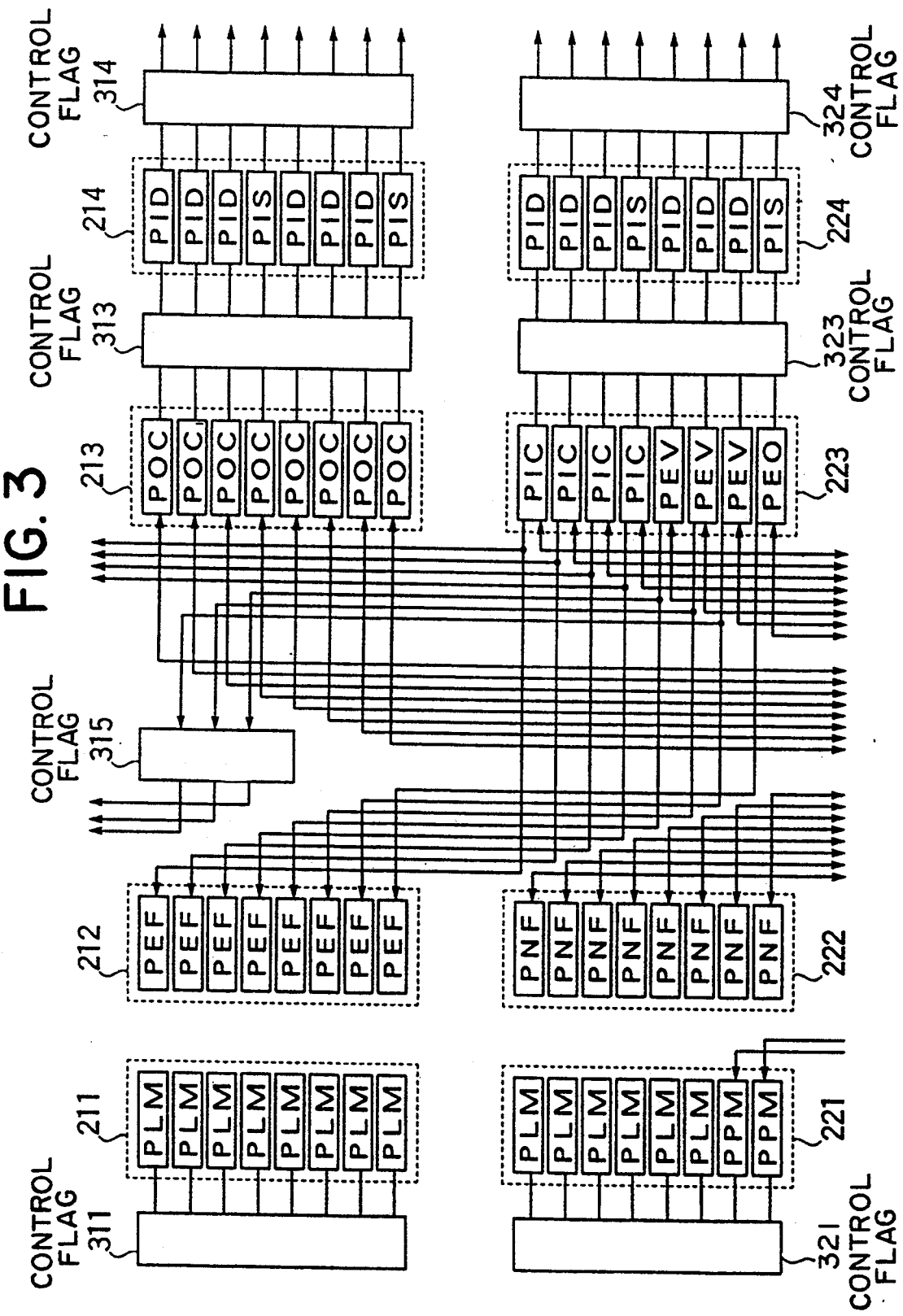
FIG. 3 is a diagram showing a relation between data input/output and a control flag in the multi-functional logic-in-memory.

The control flags 314 and 324 shown in FIG. 3 control whether or not interrupt processing to the microprocessor 102 is to be performed in accordance with the values of the fields 214 and 224, respectively. The write operation of "0" by the microprocessor 102 is allowed only for a memory bit from which the microprocessor 102 reads out "1". That is, considering the use of the memory bit as the interrupt flag, the microprocessor 102 can write "0" after it read out "1". This is because the microprocessor 102 can access only in units of bytes or words in the clear operation of a flag of the interrupt requesting source and a state of each memory bit of the field 214 or 224 upon the interrupt processing has to be restored in order to clear only the memory bit.

The priorities for the priority control processing upon confliction of the write operations is in order of "0" write by the microprocessor 102 or the DTC clear, the P1 output operation, a flag setting request based on data in the field 213 or 223.

Next, the P0 input, P1 output and Pck input operations will be described below which are accessing techniques to the multi-functional logical buffer memory.

Addressing systems of the P0 input, P1 output and Pck input operations to the fields are already described. That is, each of accesses by the P0 input, P1 output and Pck input operations can be made independently in a segment which can be designated for every word of a microinstruction. In the P0 input operation an arbitrary bit designated thus is read in and can be used independently for three operations, i.e., a branch condition for a next address designation, a carry input for an ALU operation, and an executing condition for the P1 output operation, of an microinstruction including the P0 input operation.

The P1 output can output an arbitrary value to arbitrary memory bits in accordance with an operation result of an microinstruction in which the P1 output is designated or a value read in the P0 input as a condition for performing an output operation. In the P1 output operation an arbitrary value can be outputted to an arbitrary memory bit as a condition for outputting the operation result of a microinstruction having designation of the P1 output operation or a value read in the P0 input operation. The Pck input operation is used for a skip operation of a microinstruction, different from a mere input/output function as described above. The skip operation means that whether or not a microinstruction with designation of the Pck input operation is to be executed is determined in accordance with the value read out from a memory bit field by the Pck input operation, the microinstruction is made in an NOP manner to nominally skip the microinstruction to the next microinstruction when the microinstruction is determined not to be executed. That is, the microinstruction is executed when the value read out from the memory bit field by the Pck input operation is "1" and the microinstruction is skipped otherwise.

Thus, by the multi-functional logical buffer memory are achieved various input/output functions necessary for the subprocessor 103 to emulate the peripheral functions of the microcomputer with a software at a high speed. The sixty four memory bits of the circuit 104 are initialized to "0" when the subprocessor 103 is reset or when the whole chip is reset. However, the control flag is cleared to "0" only when the whole chip is reset but is held when only the subprocessor 103 is reset, so that the write operation by the microprocessor 102 is allowed.

Next, a structure of each memory bit of the multifunctional logic-in-memory 104 will be described below.

Figure 4:
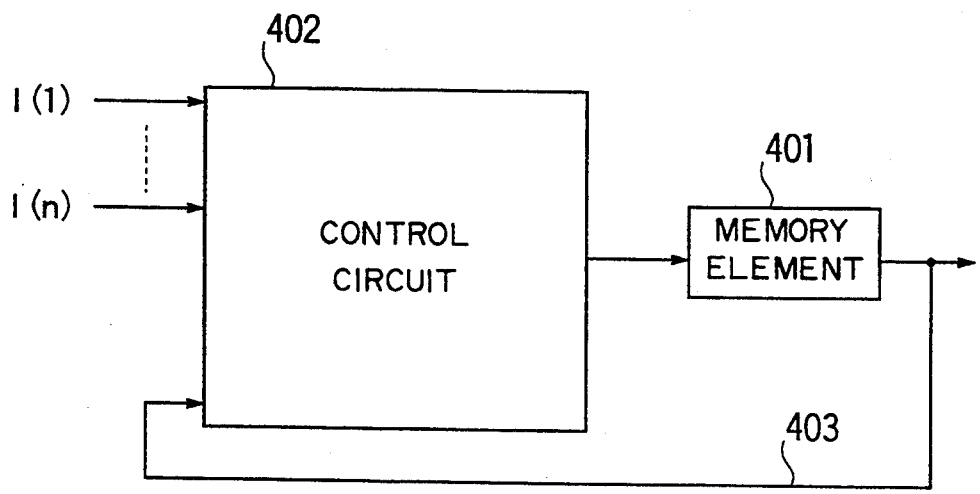
FIG. 4 is a block diagram showing a basic bit structure of the multi-functional logic-in-memory.

FIG. 4 is a block diagram showing the most basic circuit structure common to the memory bits of the logic-in-memory 104.

Each memory bit is connected to a plurality of data input signals I(i) (i=1 to n) for data input. Data held in a memory element 401 is also supplied to a control circuit 402 as input data via a line 403. The control circuit 402 selects one from among the n+1 data in accordance with predetermined priorities of the n+1 data and stores the selected data in the memory element 401. The logic-in-memory 104 includes such a control circuit for every memory bit. The control circuit 402 can be constituted of a combinational logic circuit and may be constituted of a majority circuit. A function described with reference to FIG. 4 is necessary for enabling multiple access to each memory bit and data which has been held in the memory element is written into the memory element again when any of data I(i) (i=1 to n) from the external is not selected.

In this embodiment, the logic-in-memory 104 operates in synchronism with two phase not-overlapping clock and data is read out from the memory element 401 in synchronism with the $\phi 1$ clock and stored in the memory element 401 in synchronism with the $\phi 2$ clock. Though the input data and a write control signal are inputted to the control circuit 402, even if the write control signal is changed during the $\phi 2$ clock of "1" not so as to select data, the data stored in the memory element 401 is not destroyed and stored therein again. This is because the logic-in-memory 104 has a function for processing data stored in the memory element 401 as input data via the line 403.

Figure 6:
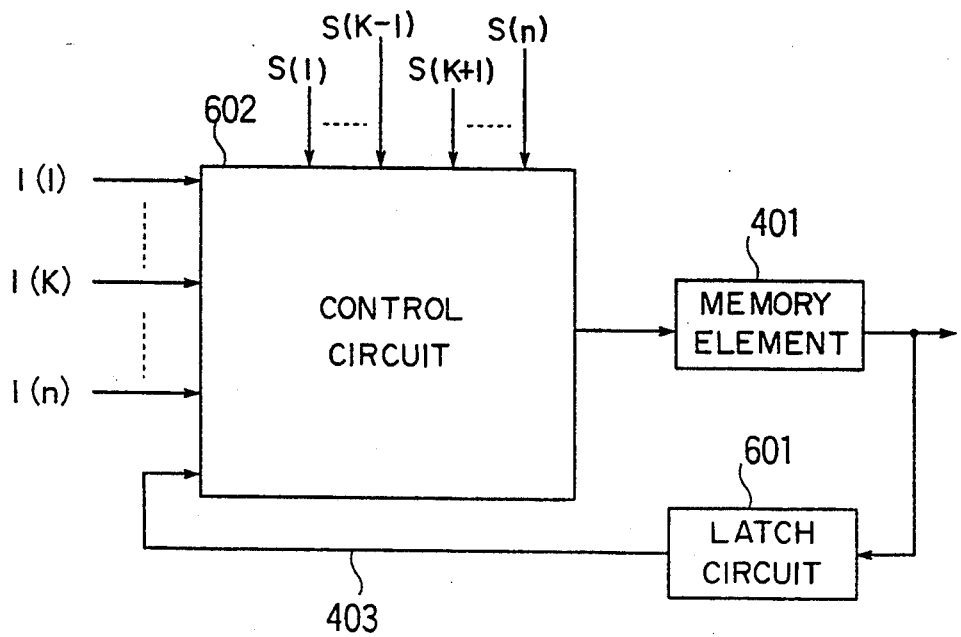
FIG. 6 is a block diagram showing another bit structure of the multi-functional logic-in-memory.
Figure 7:
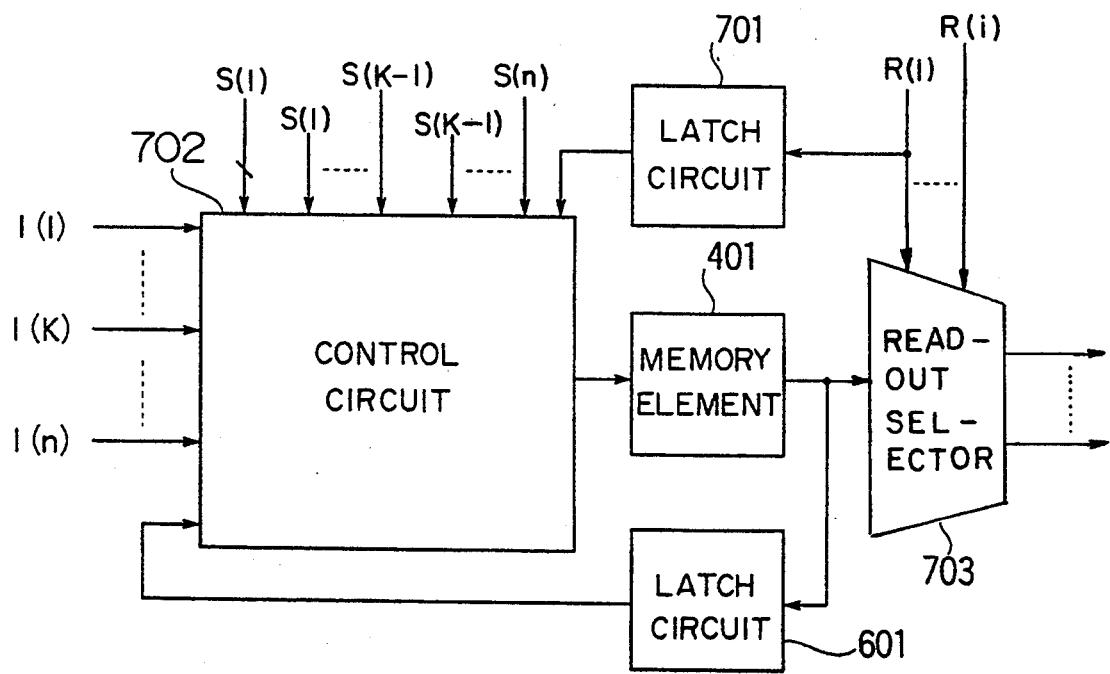
FIG. 7 is a block diagram showing still another bit structure of the multi-functional logic-in-memory.
Figure 5:
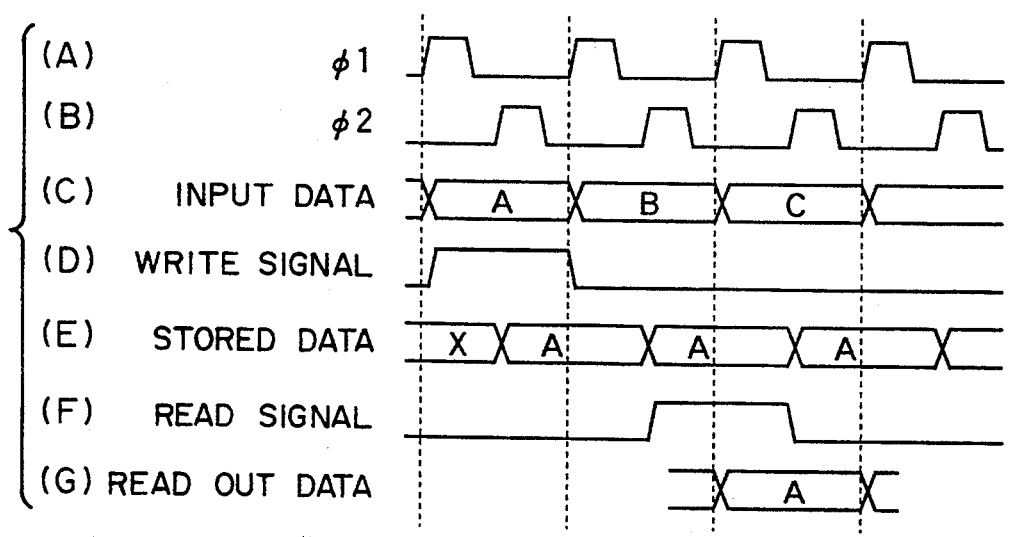
FIG. 5 includes timing charts upon a data input/output operation of the multi-functional logic-in-memory.

FIG. 6 is a diagram showing a basic arrangement of each memory bit PPM included in the field 221 shown in FIG. 3. In FIG. 6 a latch circuit 601 is inserted in the line 403 from the memory element 401 to the control circuit 602 and is used to store data latched therein in the memory element 401 again when a control signal is changed during a period of time for data to be stored not so as to select any of a plurality of input data from the external. Signals S(1, . . . ,k−1) and S(k+1, . . . ,n) are write data selecting signals for input data I(1, . . . ,k−1) and I(k=1, . . . ,n). When more than two write data selecting signals are selected, one of input data is selected by the control circuit 602 in accordance with priorities to store the selected data in the memory element 401, as described above. Here, data I(k) has not a corresponding write data selecting signal and when the data I(k) is a specific value, e.g., "1", the data I(k) is selected and processed by the control circuit 602. This data I(k) corresponds to a call signal supplied to the memory bit PPM. The latch circuit 601 is provided to supply data previously stored in the memory element 401 to the control circuit 602 again at the same timing as the plurality of input data shown in the timing chart of FIG. 5C. FIG. 7 is a block diagram showing a whole arrangement of each memory bit PPM included in the field 221 shown in FIG. 3, which arrangement is obtained by adding the read and clear function to the arrangement shown in FIG. 6. In FIG. 7, one or more read data selecting signals which are used for reading out data are provided and at least one read data selecting signal is supplied to a control circuit 702 via a latch circuit 701 which latches read out of the content of the memory element 401 to the external.

The input signals R(1, . . . ,i) are the read data selecting signals and the latch circuit 701 delays supply of the selecting signal representing the read out of data from the memory element 401 to the control circuit 702 to synchronize with the $\phi 1$ clock. The control circuit 702 performs the above read and clear operation in accordance with the data from the latch circuit 701. At this time the read and clear operation is processed in accordance with priority control as well as the input data I(1, . . . ,n) supplied to the memory bit and the processing result is stored in the memory element 401. Here, a signal M(m) supplied to the control circuit 702 is a mode signal for determining whether or not the read and clear operation is to be performed. The mode signal corresponds to the control flag 311 or 321 shown in FIG. 3 in the logic-in-memory 104.

A circuit obtained by removing input data I(k) from a circuit shown in FIG. 7 corresponds to that of the memory bit PLM included in the field 211 or 221 shown in FIGS. 2 and 3, a circuit obtained by adding a write data selecting signal corresponding to the input data I(k) to the circuit shown in FIG. 7 corresponds to that of the memory bit PIC,PEV or PEO included in the field 223, and a circuit obtained by removing the a mode signal M(m) from the circuit shown in FIG. 7 such that the circuit always operates in the read and clear operation mode corresponds to that of the memory bit PED of the field 212.

Also, a circuit obtained by removing the input data I(k) from the circuit shown in FIG. 6 corresponds to that of the memory bit PNF included in the field 222 shown in FIGS. 2 and 3 and that of the memory bit POC shown in FIGS. 2 and 3. However, in the control circuit of the memory bit POC, PIC, PEV or PEO, a specific condition is determined and the determined result is outputted to the field 214 or 224 via the control flag 313 or 323 shown in FIG. 3. The memory bit PID or PIS included in the field 214 or 224 can process the determined result as the input data. That is, it is determined that a specific condition is generated in a certain memory bit within the logic-in-memory 104 and data of other memory bits can be manipulated. This is utilized when the subprocessor 103 requests the interrupt processing to the microprocessor 102.

Figure 8:
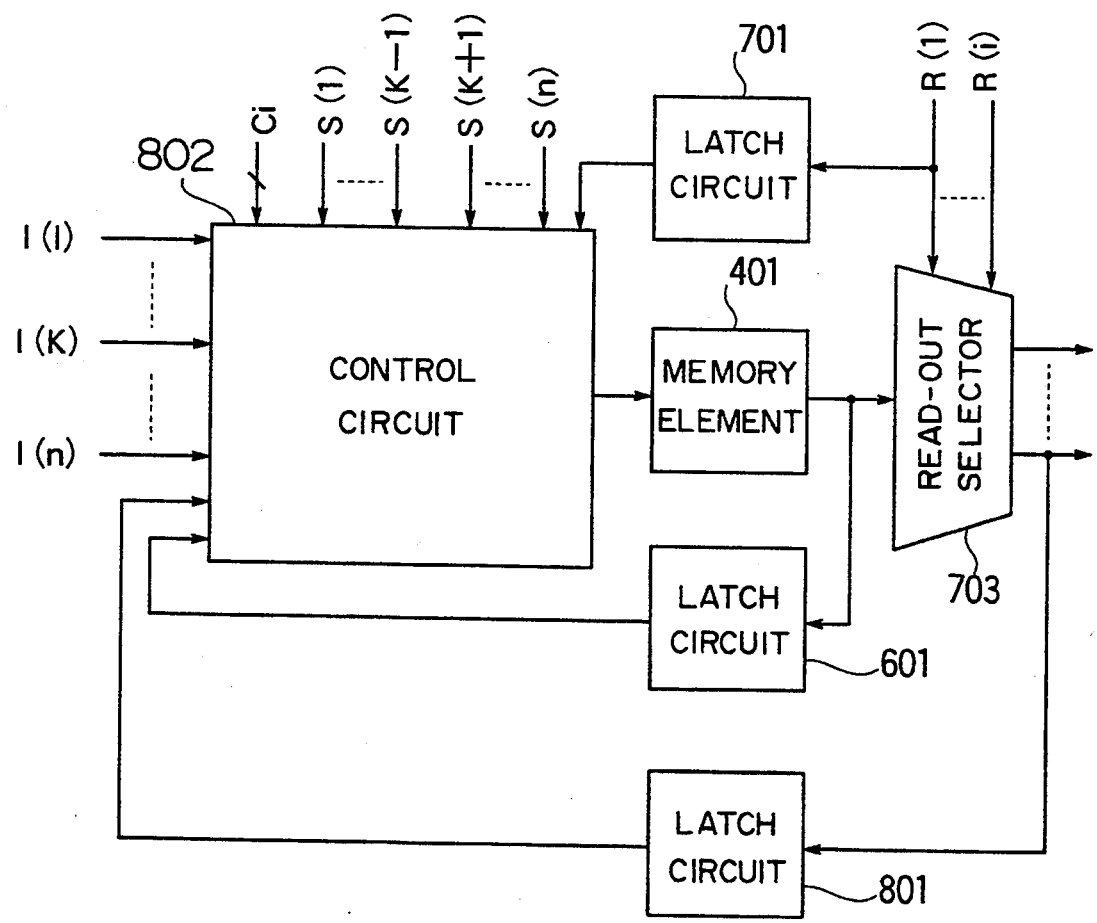
FIG. 8 is a block diagram showing moreover another bit structure of the multi-functional logic-in-memory.

FIG. 8 shows a structure of a circuit of the memory bit PID which can be used as an interrupt flag. In FIG. 8 there is provided the latch circuit 801 for latching the content of the memory element 401 when the content of the memory element 401 is read out to the external and an output from the latch circuit 801 is supplied to a control circuit 802. The control circuit 802 controls the write operation of data in the memory element in accordance with presence/absence of the output from the latch circuit 801 and the content of the output. In the circuit shown in FIG. 8, a clear signal Ci is supplied to the control circuit 802 instead of the mode signal M(m) supplied to the control circuit 702 shown in FIG. 7. Also, a write data selecting signal S(k) is added corresponding to the data I(k) which is valid when it is specific data, and the latch circuit 801 is added to latch the read out data. This circuit has a function by which only the "0" write operation can be performed for specific data after data "1" is read out. For this purpose, the latch circuit 701 latches data representing execution of a read operation for memory bit in response to a read data selecting signal and the latch circuit 801 latches data read out from the memory bit. The data representing the execution of the read operation and the read out data are supplied to the control circuit 802 which controls a write condition in accordance with these data. In addition, by asserting the clear signal Ci, a "0" clear operation or initialization can be performed in a memory bit unit. A circuit obtained by removing the clear signal Ci from the circuit shown in FIG. 8 corresponds to that of the memory bit PIS.

Figure 9:
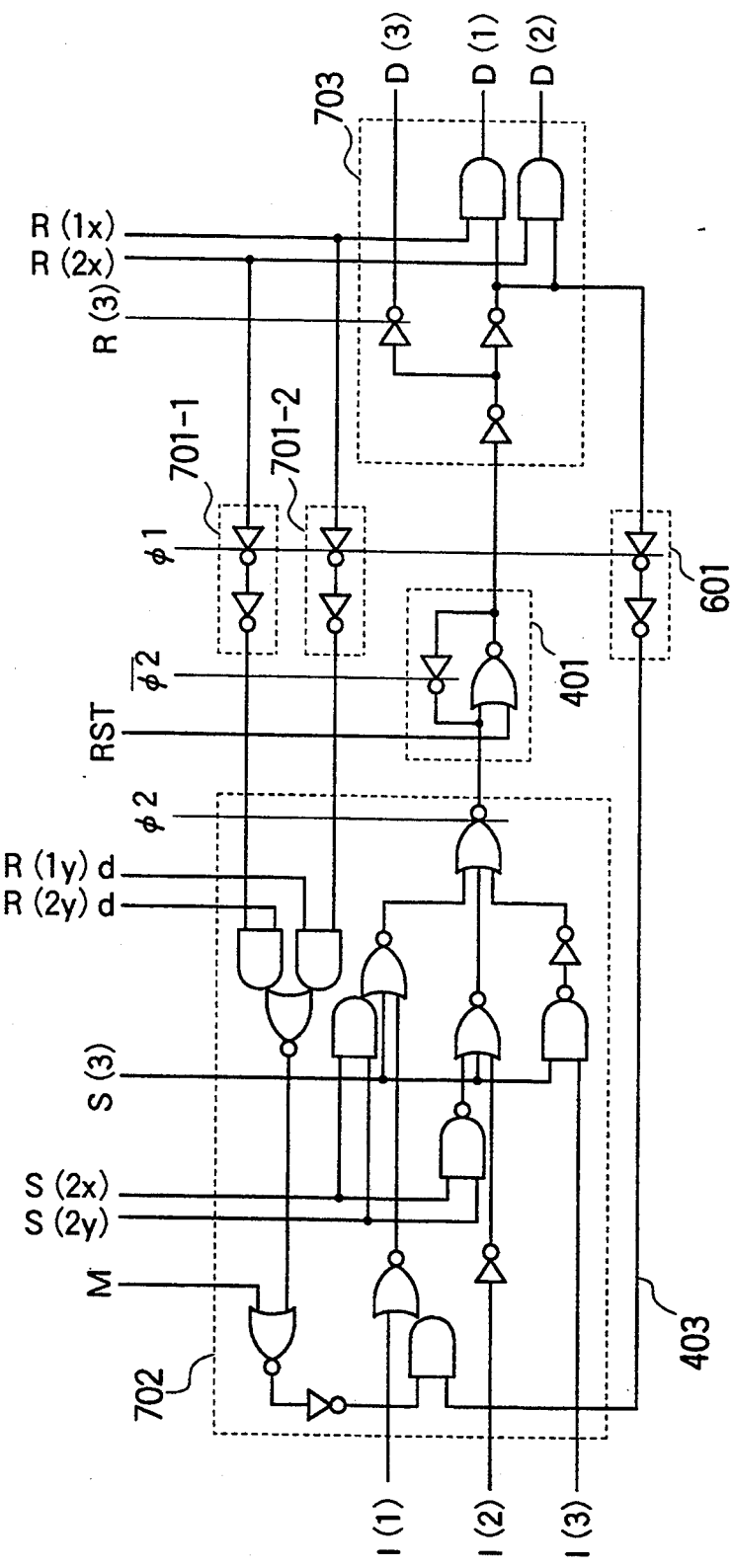
FIG. 9 fs a diagram showing the whole structure of the multi-functional logic-in-memory shown in FIG. 7.

FIG. 9 shows a circuit structure of an embodiment of the multi-functional logic-in-memory in detail. A circuit shown in FIG. 9 is a representative example of the logic-in-memory shown in FIG. 7 as one example. The circuit structure shown in FIG. 9 corresponds to the memory bits PPM which is the uppermost two bits of the byte 221 in the logic-in-memory.

Data I(1) in FIG. 9 corresponds to data I(k) in FIG. 7 and functionally corresponds to a call signal of the memory bit PPM. That is, a data selecting signal is not provided for the data I(1) which is written in the memory element 401 in accordance with a predetermined priority in the present embodiment when the data I(1) is "1". Data I(2) and I(3) are other data and functionally data I(2) is the P1 output from the subprocessor 103 and the data I(3) corresponds to write data from the microprocessor 102.

The write data selecting signals for the data I(2) are S(2x) and S(2y), the signal S(2x) being a row selecting signal and the signal S(2y) being a column selecting signal. That is, when both the signals S(2x) and S(2y) are set to "1" the data I(2) is selected. The write data selecting signal for the data I(3) is S(3) and when it is "1" the data I(3) is selected.

Column selecting signals R(1y)d and R(2y)d as the read data selecting signals corresponds to row selecting signals R(1x) and R(2x), respectively. These signals R(1y)d and R(2y)d are inputted at the timing the $\phi 1$ clock after a half cycle from the A2 timing at which signals R(1x) and R(2x) are inputted and an AND operation is performed between the signals R(1y)d and R(2y)d and the signals R(1x) and R(2x) latched in latch circuits 701-1 and 701-2 to generate a selecting signal for the read and clear operation. A signal M is a signal for setting a mode of the read and clear operation and when the signal M=0 the read and clear operation mode is set. Two sets of read data selecting signals correspond to the Pck and P0 inputs from the subprocessor 103 and in this embodiment the read and clear operation can be performed even for one of the two read operation. The input data 403 is data which has been stored in the memory by latched by the latch circuit 601. The control circuit 702 is a combinational circuit for selecting the input data in accordance with predetermined priorities based on the input data and a control signal described above.

In this embodiment, the write operation by the microprocessor 102 is assigned with the highest priority, and subsequently, higher priorities are assigned to in order of the P1 output operation from the subprocessor, the call receiving operation, and the read and clear operation, i.e., I(3), I(2) and I(1). Various selecting operations can be available by constituting the control circuit 702 by use of a proper combinational circuit. In addition, in this embodiment, a reset signal RST is supplied to reset the memory element 401. In the reading out selector 703, three types of read out operations, i.e., D(1), D(2) and D(3) are controlled so that data can be read out in parallel at the same time. The logic-in-memory 104 further includes a read out circuit for the read out operations of D(1) and D(2), in which read out circuit the output from the selector 703 is logically ORed for a string of sixteen bits for each read out operation D(1) or D(2) and the ORed results for four strings are selected in accordance with column selecting signals.

A concrete structure of the multi-functional logic-in-memory shown in FIGS. 4, 6 or 8 can be attained using the logic circuit shown in FIG. 9.

Figure 10:
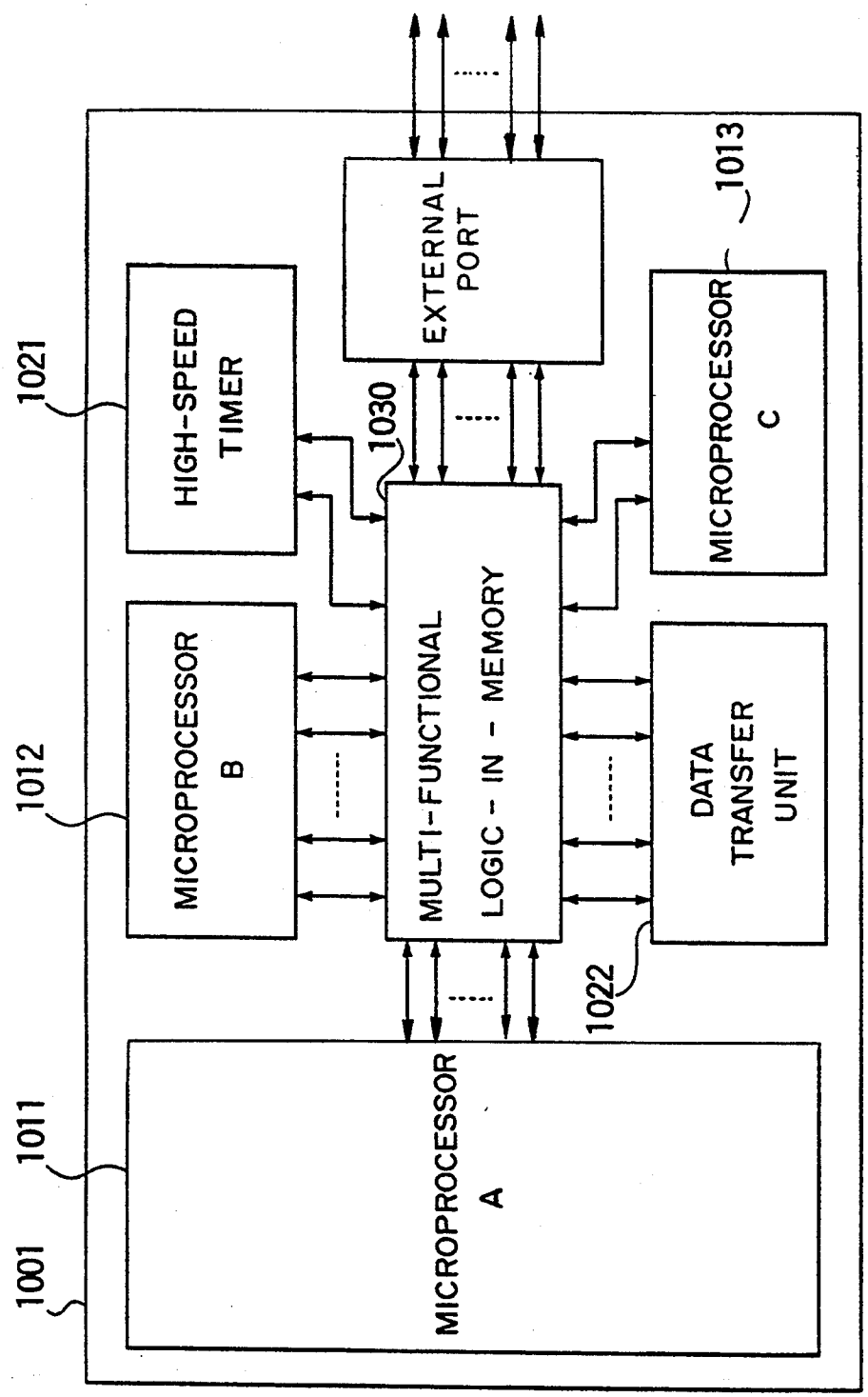
FIG. 10 is a block diagram showing an arrangement of a single-chip microcomputer according to another embodiment of the present invention, the microcomputer accommodating a multi-functional logic-in-memory.

An example of the logic-in-memory 104 with the priority processing function as a general buffer logic-in-memory for input/output control is shown in FIG. 10 as another embodiment of the present invention.

FIG. 10 shows the example in which three microprocessor 1011, 1012 and 1013, a timer 1021 which operates at high speed, a data transfer unit 1022 which can transfer data at high speed without the microprocessor is integrated on the same LSI chip 1001. Each of modules exchanges data with the external through the multi-functional logic-in-memory 1030. The logic-in-memory 1030 can perform exchange of data with each module as well as the external device outside of the chip via the external port. By using the logic-in-memory 1030, the number of terminals necessary for exchanging data with the external devices at the same time can be made minimum. In addition, each time each module necessitates exchange of data with the external device the module is assigned with a priority and a functional attribute for necessary to the module is set, and thereby the interface with the external device outside of the chip can be established.

It should be noted that the multi-functional logic-in-memory can be applied to not only input/output control but also a general multi-functional memory. In this case, any of the structures shown in FIG. 4 and FIGS. 6 to 8 can widely be used as one element of the multi-functional logic-in-memory.

According to the present invention, in a processor for emulating at high speed a plurality of functions which are conventionally realized with an exclusive hardware, its input/output interface can be effectively established without any time lag. And, an area for layout of it can be made small compared to that in a case of a random circuit.

What is claimed is:

1. A single-chip microcomputer comprising:

a microprocessor;
a subprocessor for peripheral functions;
a first port for controlling an input/output operation;
a memory including a plurality of 1-bit memory elements;
each of said plurality of 1-bit memory elements has three separate inputs including a first input for receiving data from said microprocessor, a second input for receiving data from said subprocessor, a third input for receiving data from said first port and each of the 1-bit memory elements has a selector which selects data from either one of said microprocessor, said subprocessor and said first port.

2. The single-chip microprocessor according to claim 1 further comprising:
a column selecting circuit and a row selecting circuit, wherein said plurality of 1-bit memory elements are arranged in a matrix manner and each of said plurality of 1-bit memory elements is selected in accordance with a combination of a column selecting signal from said column selecting circuit and a row selecting signal from said row selecting circuit.

3. The single-chip microcomputer according to claim 1, wherein said subprocessor can perform multiple accesses to different addresses of said memory at a same time.

4. The single-chip microcomputer according to claim 1, wherein said subprocessor can execute a plurality of tasks in a time-divisional manner.

5. The single-chip microcomputer according to claim 1,
wherein at least one of said 1-bit memory elements is written at a digital value "0" after said microprocessor reads out a digital value "1" from said at least one 1-bit memory element.

6. The single-chip microcomputer according to claim 1, wherein said microprocessor reads out data from a register provided in said subprocessor and the data held in the register is not changed even by the reading operation by said microcomputer.

7. The single-chip microcomputer according to claim 1,
wherein said selector selects data from either one of said microprocessor, said subprocessor and said first port in accordance with predetermined priorities therein when write accesses to the 1-bit memory element from at least two of said microprocessor, said subprocessor and said first port conflict each other.

8. The single-chip microcomputer according to claim 1 wherein a control circuit for performing desired functions is provided for each 1-bit memory element.

* * * * *